United States Patent
Chin et al.

(10) Patent No.: US 10,061,959 B2
(45) Date of Patent: Aug. 28, 2018

(54) ELECTRONIC APPARATUS WITH MULTI-FINGER FINGERPRINT IDENTIFYING FUNCTION

(71) Applicant: SUPERC-TOUCH CORPORATION, New Taipei (TW)

(72) Inventors: Shang Chin, New Taipei (TW); Hsiang-Yu Lee, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 0 days.

(21) Appl. No.: 15/252,870

(22) Filed: Aug. 31, 2016

(65) Prior Publication Data
US 2017/0083739 A1    Mar. 23, 2017

(30) Foreign Application Priority Data

Sep. 17, 2015    (TW) .............................. 104130847 A

(51) Int. Cl.
*G06K 9/00* (2006.01)
*G06F 3/044* (2006.01)
(Continued)

(52) U.S. Cl.
CPC ......... *G06K 9/00013* (2013.01); *G06F 3/041* (2013.01); *G06F 3/044* (2013.01);
(Continued)

(58) Field of Classification Search
CPC ........... G06K 9/00892; G06K 9/00006; G06K 9/00013; G06K 9/0002; G06F 3/044;
(Continued)

(56) References Cited

U.S. PATENT DOCUMENTS

2010/0109838 A1   5/2010  Fisher
2012/0105081 A1*  5/2012  Shaikh ................ G06K 9/0002
                                              324/686
(Continued)

FOREIGN PATENT DOCUMENTS

CN    201044099 Y    4/2008
CN    102566840 A    7/2012
(Continued)

OTHER PUBLICATIONS

Office Action dated Feb. 17, 2016 of the corresponding Taiwan patent application.
Office Action dated Nov. 29, 2016 of the corresponding Taiwan patent application.

*Primary Examiner* — Geoffrey E Summers
(74) *Attorney, Agent, or Firm* — Chun-Ming Shih; HDLS IPR Services

(57) ABSTRACT

An electronic apparatus with multi-finger fingerprint identifying function includes at least one multi-finger fingerprint sensor having a sensing electrode matrix with a side length of at least two centimeters such that the multi-finger fingerprint sensor can sense the fingerprints of at least two fingers simultaneously or sense user gesture. The electronic apparatus can authenticate the user fingerprint and sense user gesture and execute a predetermined operation according to the authentication result and the sensed user gesture.

6 Claims, 5 Drawing Sheets

(51) Int. Cl.
    *G06F 3/0488*     (2013.01)
    *G06F 3/041*     (2006.01)
    *H04M 1/725*     (2006.01)

(52) U.S. Cl.
    CPC ....... *G06F 3/04883* (2013.01); *G06K 9/0002* (2013.01); *G06K 9/00892* (2013.01); *H04M 1/725* (2013.01); *G06F 2203/04104* (2013.01); *G06F 2203/04808* (2013.01)

(58) Field of Classification Search
    CPC ........... G06F 2203/04104; G06F 3/041; G06F 3/04883; G06F 2203/04808; H04M 1/725
    USPC ....................................................... 382/124
    See application file for complete search history.

(56) References Cited

U.S. PATENT DOCUMENTS

| | | | |
|---|---|---|---|
| 2012/0182253 A1* | 7/2012 | Brosnan | G06F 3/0416 345/174 |
| 2013/0076486 A1* | 3/2013 | Bond | G06K 9/0002 340/5.83 |
| 2016/0063230 A1* | 3/2016 | Alten | G06F 21/32 726/28 |

FOREIGN PATENT DOCUMENTS

| | | |
|---|---|---|
| CN | 203982401 U | 12/2014 |
| TW | M491218 U | 12/2014 |
| TW | 201510776 A | 3/2015 |

\* cited by examiner

ELECTRONIC APPARATUS WITH MULTI-FINGER FINGERPRINT IDENTIFYING FUNCTION

BACKGROUND OF THE INVENTION

Field of the Invention

The present invention relates to a fingerprint identifying apparatus, especially to an electronic apparatus with multi-finger fingerprint identifying function and the method for the same.

Description of Related Art

Biometric identifying technologies have rapid development due to the strong request from electronic security applications and automatic access control system. The biometric identifying technologies can be classified into fingerprint identifying, iris identifying and DNA identifying and so on. For the considerations of efficiency, safety and non-invasiveness, the fingerprint identifying becomes main stream technology. The fingerprint identifying device can scan fingerprint image by optical scanning, thermal imaging or capacitive imaging. For cost, power-saving, reliability and security concerns, the capacitive fingerprint sensor becomes popular for biometric identifying technology applied to portable electronic devices.

The conventional fingerprint identifying scheme only allows fingerprint identifying for single finger of single people, the safety and anti-fake function are not satisfactory, especially for the authentication involving national security, access control of confidential location, the activation of confidential device, the transaction of large amount of money and so on. The authentication security can be enhanced if the authentication scheme is conducted with multiple fingers of single person or fingers of multiple persons at the same time. The anti-faking function can be further improved if the authentication scheme is reinforced with gesture based or gesture change operation.

It is an object of the present invention to provide an electronic apparatus with multi-finger fingerprint identifying function, which is used for multiple fingers of single person or fingers of multiple persons at the same time, thus greatly improving the authentication security.

SUMMARY OF THE INVENTION

Accordingly, the present invention provides a fingerprint identifying apparatus, comprising: a casing; and at least one multi-finger fingerprint sensor arranged on the casing, the at least one multi-finger fingerprint sensor having a sensing electrode matrix with a side length not less than two centimeters, whereby the multi-finger fingerprint sensor provides fingerprint sensing for at least two fingers.

Accordingly, the present invention provides an electronic apparatus with multi-finger fingerprint identifying function comprising: a casing; at least one multi-finger fingerprint sensor arranged on the casing, the at least one multi-finger fingerprint sensor having a sensing electrode matrix with a side length not less than two centimeters, whereby the multi-finger fingerprint sensor provides fingerprint sensing for at least two fingers; a processor electrically connected to the multi-finger fingerprint sensor; and a display panel electrically connected to the processor.

Accordingly, the present invention provides a method for operating multi-finger fingerprint identifying in an electronic apparatus with function, comprising: (a) providing at least one multi-finger fingerprint sensor, the at least one multi-finger fingerprint sensor having a sensing electrode matrix with a side length not less than two centimeters, whereby the multi-finger fingerprint sensor provides fingerprint sensing for at least two fingers or gesture sensing; (b) sensing fingerprints and a gesture of a user operating the multi-finger fingerprint sensor; and (c) performing a predetermined operation of the electronic apparatus based on a identifying result of the fingerprints and/or the gesture of the user.

The present invention provides a fingerprint identifying mechanism for multiple fingers of single person or fingers of multiple persons at the same time, thus greatly improving the authentication security.

The present invention further provides gesture-based operation to an electronic device by above mentioned multi-finger fingerprint identifying scheme.

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale.

DETAILED DESCRIPTION OF THE INVENTION

Figure 1:
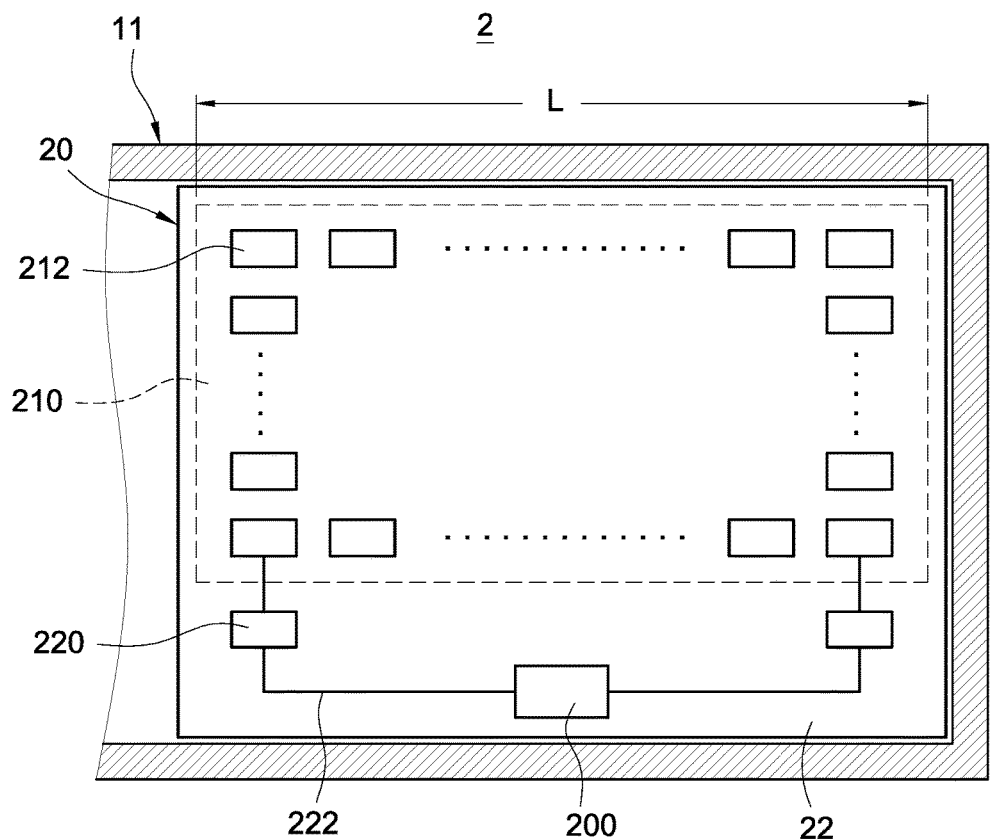
FIG. 1 is a schematic diagram of the multi-finger fingerprint identifying apparatus according to the present invention.

FIG. 1 is a schematic diagram of the multi-finger fingerprint identifying apparatus 2 according to the present invention. The multi-finger fingerprint identifying apparatus 2 comprises a casing 11 and a multi-finger fingerprint sensor 20 on the casing 11. According to one implementation, the multi-finger fingerprint sensor 20 comprises a fingerprint sensing substrate 22, a fingerprint sensing circuit 200 on the fingerprint sensing substrate 22 and a sensing electrode matrix 210. The sensing electrode matrix 210 comprises a plurality of sensing electrodes 212. The multi-finger fingerprint sensor 20 further comprises a plurality of selection switches 220 and a plurality of conductive wires 222. By the selection switches 220 and the conductive wires 222, the fingerprint sensing circuit 200 can selectively obtain one or more sensing signal input through the selection switches 220 for fingerprint identifying. Moreover, in other implementations, the fingerprint sensing circuit 200 may be arranged on a flexible circuit board (or a rigid circuit board) outside the fingerprint sensing substrate 22, and the fingerprint sensing circuit 200 may be electrically connected to the fingerprint sensing substrate 22 through the flexible circuit board. The fingerprint sensing circuit 200 may be corresponding to one multi-finger fingerprint sensor or a plurality of multi-finger fingerprint sensors. In this implementation, the multi-finger fingerprint sensor 20 does not comprises the fingerprint sensing circuit 200 and the fingerprint sensing circuit 200 is arranged on another electronic device, which has different substrate with that of the multi-finger fingerprint sensor 20.

To prevent from the mutual interference between the sensing electrodes 212 in the sensing electrode matrix 210, the electronic apparatus with multi-finger fingerprint identifying can employ the technology disclosed in Taiwan patent application No. 103213948, filed in Aug. 6, 2014 by the same applicant. A plurality of the sensing electrodes are arranged on one side of a substrate and each of the sensing electrodes has a data output selection element (namely the selection switches 220) and at least one reference-voltage selection element. The data output selection element has a first end connected to the corresponding sensing electrode and a second end connected to the corresponding reference-voltage selection wire. A controller (namely the fingerprint sensing circuit 200) organizes the plurality of sensing electrodes into at least one sensing region and at least one non-sensing region by the data output selection elements, the data output selection wires, the reference-voltage selection elements and the reference-voltage selection wires. Moreover, the controller selectively senses one of the sensing electrodes 212 and reads the signal therefrom, thus preventing the mutual interference between the sensing electrodes 212 in the sensing electrode matrix 210.

Moreover, in the above multi-finger fingerprint sensor 20, the sensing area of the sensing electrode matrix 210 can allow the sensing of at least two fingers at the same time. For example, one side length L of the sensing electrode matrix 210 is not less than 2 centimeters for the sake of multi-finger fingerprint sensing. In the above mentioned multi-finger fingerprint sensor 20, the fingerprint sensing circuit 200 may be a self-capacitance fingerprint sensing circuit. The fingerprint sensing substrate 22 may be a polymer substrate, a glass substrate, or a metal substrate. Each of the sensing electrodes 212 may be of polygonal shape, circular shape, elliptical shape, rectangular shape, rhombic shape or square shape. Each of the sensing electrodes 212 may be made from conductive metal material, which is selected from the group consisted of: chromium (Cr), barium (Ba), aluminum (Al), silver (Ag), copper (Cu), titanium (Ti), nickel (Ni), tantalum (Ta), cobalt (Co), tungsten (W), magnesium (Mg), calcium (Ca), potassium (K), lithium (Li), indium (In), an alloy of above metals. The selection switch 220 may be thin film transistor switch or CMOS transistor switch.

Figure 2:
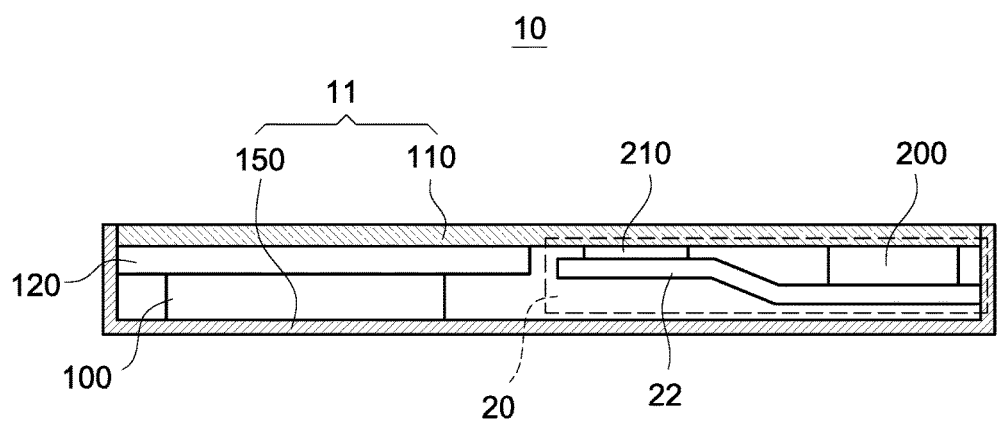
FIG. 2 shows the sectional view of the electronic apparatus with multi-finger fingerprint identifying function according to the present invention.

FIG. 2 shows the sectional view of the electronic apparatus 10 with multi-finger fingerprint identifying function according to the present invention. The electronic apparatus 10 comprises a casing 11. The casing 11 comprises a lower casing 150 and a transparent upper casing 110 for protection function. The multi-finger fingerprint sensor 20 shown in FIG. 1 may be arranged on the upper casing 110. The electronic apparatus 10 with multi-finger fingerprint identifying function further comprises a display panel 120, a processor 100, where the processor 100 is used to control the electronic apparatus 10 (such as a mobile device, a panel computer, a media playback device, a vehicle controller, an access controller or a remote controller). The processor 100 may be composed of circuit board, integrated circuit or electronic components. The upper casing 110 and the lower casing 150 constitutes a space for accommodating the display panel 120, the multi-finger fingerprint sensor 20 and the processor 100 and render the display panel 120 and the multi-finger fingerprint sensor 20 visible through the transparent upper casing 110 whereby the user can view the information of a mobile device and operate the mobile device.

The display panel 120 is used to display the information of the mobile device. One side surface of the upper casing 110 is attached to the display panel 120 or in proximity with the display panel 120 to protect the display panel 120. The upper casing 110 may be a transparent glass. The multi-finger fingerprint sensor 20 is attached to the side surface of the upper casing 110 to provide fingerprint sensing function for user. The multi-finger fingerprint sensor 20 comprises a fingerprint sensing substrate 22, a fingerprint sensing circuit 200 and a sensing electrode matrix 210 arranged on the fingerprint sensing substrate 22. With reference again to FIG. 1, the sensing electrode matrix 210 comprises a plurality of sensing electrodes 212. The multi-finger fingerprint sensor 20 further comprises a plurality of selection switches 220 and a plurality of conductive wires 222 arranged on the fingerprint sensing substrate 22. By the selection switches 220 and the conductive wires 222, the fingerprint sensing circuit 200 can selectively obtain one or more sensing signal input through the selection switches 220 for fingerprint identifying. Moreover, the multi-finger fingerprint sensor 20 may send the identifying result to the processor 100 for performing functional control for the mobile device, which will be detailed later.

In other possible embodiments of the present invention, the multi-finger fingerprint sensor 20 may also be arranged on the bottom surface or the lateral surface of the lower casing 150. Alternatively, a plurality of multi-finger fingerprint sensors 20 may be arranged on the upper casing 110 and/or the lower casing. The multi-finger fingerprint sensor 20 may be arranged on other flexible or rigid circuit board, or the fingerprint sensing circuit 200 may be integrated in the processor and electrically connected to the multi-finger fingerprint sensor 20 through flexible cables, thus achieving fingerprint identifying, palm print identifying or multi-finger gesture operation.

The fingerprint sensing substrate 22 may be flexible substrate made of polymer film. The plurality of sensing electrodes 212 are arranged on one surface of the fingerprint sensing substrate 22 and attached to the transparent upper casing 110 to sense the user fingerprint and generate a fingerprint image. The fingerprint sensing circuit 200 are arranged on the surface of the fingerprint sensing substrate 22 and attached to the transparent upper casing 110. The fingerprint sensing circuit 200 is electrically connected to the sensing electrodes 212 to sense the minute stray capacitance change of the sensing electrodes 212. The fingerprint sensing circuit 200 may be a detector for minute impedance change and its technology can be referred to Taiwan patent application No. 103215145, filed in Aug. 25, 2014 by the same applicant.

After receiving the multi-finger fingerprint signal sent from the multi-finger fingerprint sensor 20, the processor 100 of the electronic apparatus 10 can perform fingerprint identification and/or gesture determination, whereby the electronic apparatus 10 can activates functions such as turning on a device, paying payment, dialing telephone, turning page on a screen, adjusting volume, adjusting brightness, changing channel, access control, activating power of machine or activating specific programs and so on.

Figure 3A:
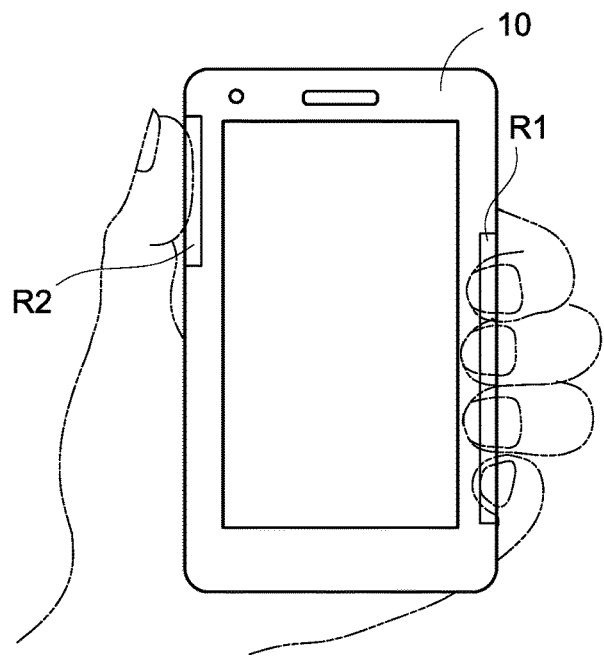
FIGS. 3A to 3C show the operation method of the electronic apparatus with multi-finger fingerprint identifying function according to an embodiment of the present invention.
Figure 3B:
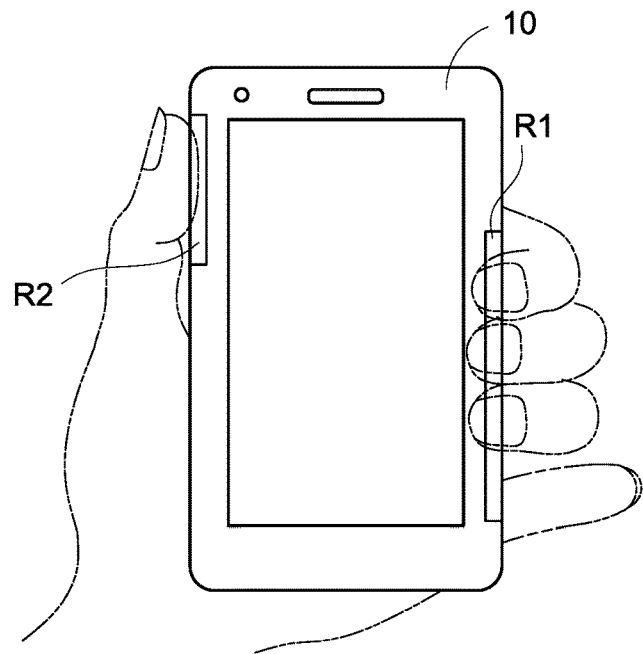
Figure 3C:
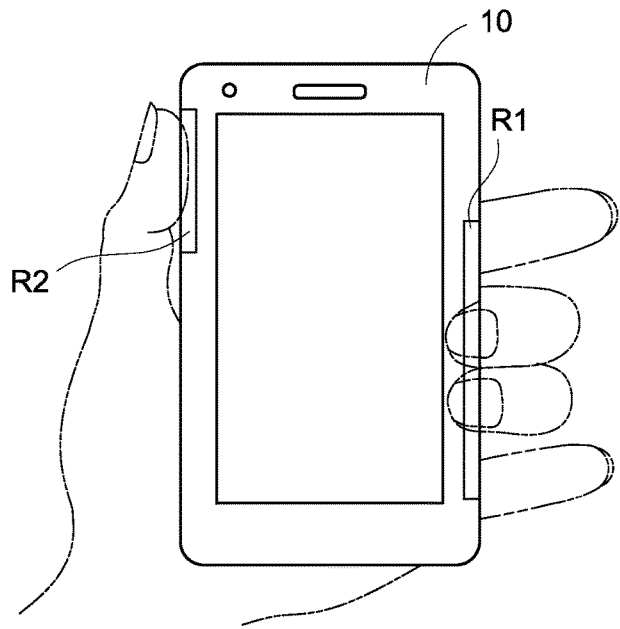

FIGS. 3A to 3C show the operation method of the electronic apparatus with multi-finger fingerprint identifying function according to an embodiment of the present invention. The method is operated in the electronic apparatus 10 with multi-finger fingerprint identifying function as shown in FIG. 2. As shown in FIG. 3A, the electronic apparatus 10 is, for example, a smart phone with rectangular casing, where the casing has two long sides and two short sides. The two long sides are provided with a first fingerprint sensor R1 and a second fingerprint sensor R2, respectively. The first fingerprint sensor R1 is a multi-finger fingerprint sensor, which may include, for example, the sensing electrode matrix 210 shown in FIG. 1. In other word, the length of the sensing electrode matrix in the first fingerprint sensor R1 is not less than 2 centimeters for the sake of a multi-finger operation. As shown in FIG. 3A, at a first time point t1 for the beginning of operation, the thumb of the user presses on the second fingerprint sensor R2 while the remaining four fingers press on the first fingerprint sensor R1. At a later time point t2, the little finger of user leaves the first fingerprint sensor R1. The multi-finger fingerprint sensor 20 has the ability of multi-finger identifying and generates multi-finger identifying signals. The processor 100 of the electronic apparatus 10 receives the multi-finger identifying signals from the multi-finger fingerprint sensor 20 and makes following determinations: (1) whether the current user is the authenticated user of the electronic apparatus 10; and (2) the gesture of the user. The electronic apparatus 10 then performs predetermined operations based on above determinations.

Taking the scenarios in FIGS. 3A and 3B as examples, the electronic apparatus 10 will not perform further operations and optionally display error message if the electronic apparatus 10 determines that the current user is not the authenticated user of the electronic apparatus 10 according to the sensing results from the first fingerprint sensor R1 and the second fingerprint sensor R2. The electronic apparatus 10 may perform further operations if the electronic apparatus 10 determines that the current user is the authenticated user of the electronic apparatus 10 according to the sensing results from the first fingerprint sensor R1 and the second fingerprint sensor R2. As can be seen from the examples shown in FIGS. 3A and 3B, the processor 100 of the electronic apparatus 10 can perform predetermined function based on gesture change. For example, the electronic apparatus 10 of the electronic apparatus 10 may perform unlock function when one finger is released from pressing position (from FIG. 3A to FIG. 3B). Moreover, the processor 100 of the electronic apparatus 10 can also perform corresponding function after the processor 100 determines that the current user is the authenticated user of the electronic apparatus 10 and a series of predetermined gestures are detected. For example, if the authenticated user of the electronic apparatus 10 is forced by an outlaw to operate his smart phone, the authenticated user of the electronic apparatus 10 may perform a series of operations as shown in FIGS. 3A to 3C to dial a distress call unaware to the outlaw. The series of operations (gestures changes) include pressing the smart phone with five fingers of one hand (FIG. 3A), releasing one finger (such as the little finger shown in FIG. 3B) to unlock the smart phone and releasing another finger (such as the index finger shown in FIG. 3C) to dial a distress call unaware to the outlaw.

Figure 4:
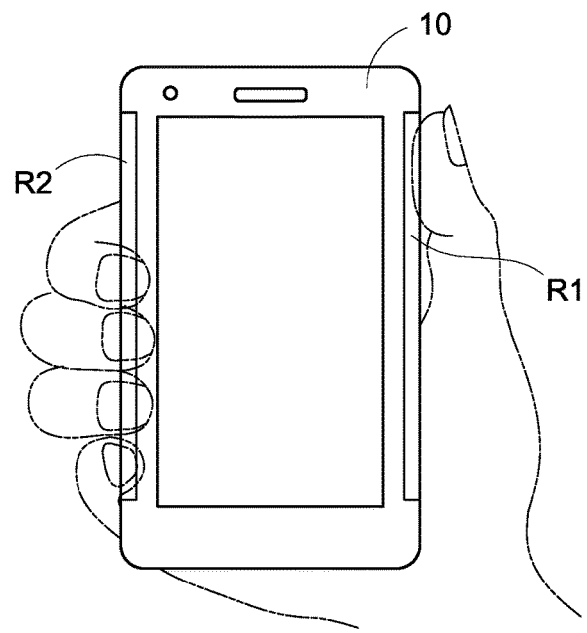
FIGS. 4 to 7 show the schematic views of the electronic apparatus according to different embodiments of the present invention.

FIG. 4 shows the schematic view of the electronic apparatus 10 according to another embodiment of the present invention. The electronic apparatus 10 also has a rectangular casing, where the casing has two long sides and two short sides. A first fingerprint sensor R1 and a second fingerprint sensor R2 are arranged on the long sides respectively, where both the first fingerprint sensor R1 and the second fingerprint sensor R2 are multi-finger fingerprint sensors, which may include, for example, the sensing electrode matrix 210 shown in FIG. 1. The electronic apparatus 10 shown in FIG. 4 provide convenience to user of different dominant hand (right-hander or southpaw).

Figure 5:
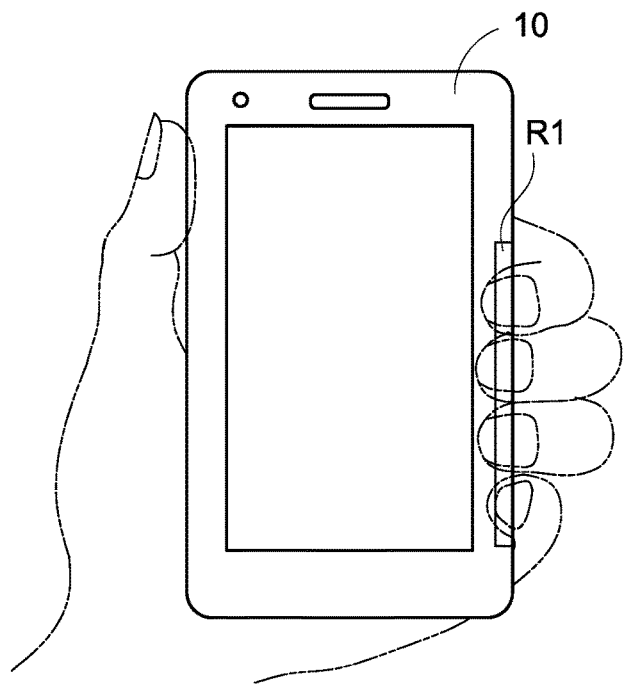

FIG. 5 shows the schematic view of the electronic apparatus 10 according to still another embodiment of the present invention. The electronic apparatus 10 shown in FIG. 5 also has a rectangular casing, where the casing has two long sides and two short sides. The electronic apparatus 10 only has a first fingerprint sensor R1 arranged on one long side. The first fingerprint sensor R1 is a multi-finger fingerprint sensor, which may include, for example, the sensing electrode matrix 210 shown in FIG. 1. The electronic apparatus 10 shown in FIG. 5 also can perform multi-finger identifying and gesture-based operation.

Figure 6:
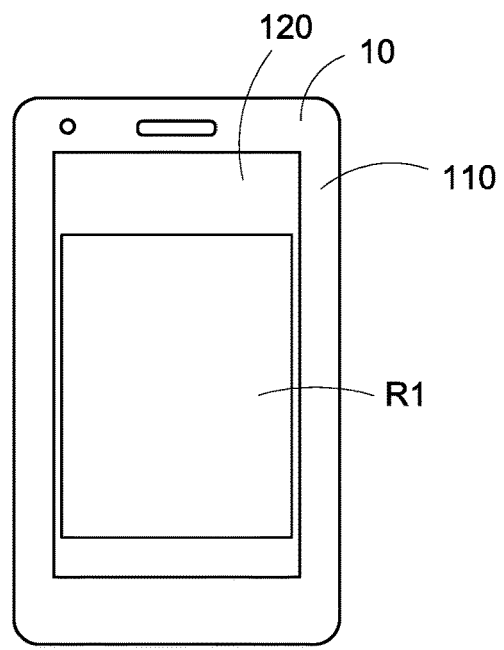

FIG. 6 shows the schematic view of the electronic apparatus 10 according to still another embodiment of the present invention. The electronic apparatus 10 in FIG. 6 has a first fingerprint sensor R1 arranged on a display region (corresponding to the display panel 120), where the first fingerprint sensor R1 is a multi-finger fingerprint sensor, which may include, for example, the sensing electrode matrix 210 shown in FIG. 1. In this embodiment, the sensing electrodes of the sensing electrode matrix are made from transparent conductive material such as indium tin oxide. The selection switches and the conductive wires of the first fingerprint sensor R1 may be arranged on locations corresponding to the gate lines and data lines of thin film transistor of the display panel to prevent from degrading the light transmittance. The first fingerprint sensor R1 shown in FIG. 6 may be incorporated with touch control function.

Figure 7:
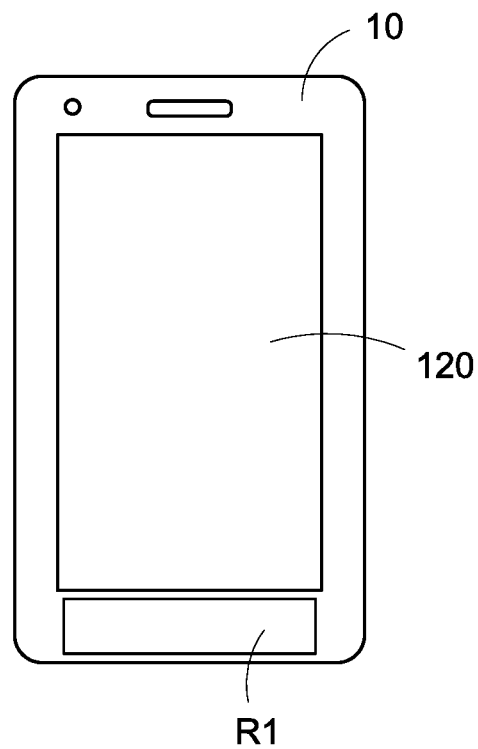

FIG. 7 shows the schematic view of the electronic apparatus 10 according to still another embodiment of the present invention. The electronic apparatus 10 in FIG. 7 has a first fingerprint sensor R1 arranged on a non-display region (corresponding to the region outside the display panel 120), where the first fingerprint sensor R1 is a multi-finger fingerprint sensor, which may include, for example, the sensing electrode matrix 210 shown in FIG. 1. Besides, the first fingerprint sensor R1 may be arranged on backside of the casing opposite to the display panel to provide palm print identifying function.

To sum up, the present invention has following advantages:

1. The fingerprint sensor has wider sensing electrode matrix (for example, one side length of the sensing electrode matrix is not less than 2 centimeters) to provide multi-finger fingerprint identifying, thus greatly enhancing the security level of user authentication.

2. The electronic apparatus equipped with the multi-finger fingerprint identifying function can provide gesture-based operation.

Thus, particular embodiments have been described. Other embodiments are within the scope of the following claims. For example, the actions recited in the claims may be performed in a different order and still achieve desirable results.

What is claimed is:

1. A fingerprint identifying apparatus, comprising
a casing;
at least one multi-finger fingerprint sensor arranged on the casing, the at least one multi-finger fingerprint sensor having a sensing electrode matrix with a side length not less than two centimeters, whereby the multi-finger fingerprint sensor provides fingerprint sensing for at least two fingers; and
at least one fingerprint sensing circuit, wherein the multi-finger fingerprint sensor further comprises: a fingerprint sensing substrate; a plurality of sensing electrodes to constitute the sensing electrode matrix; a plurality of selection switches; and a plurality of conductive wires, wherein the sensing electrodes, the selection switches and the conductive wires are arranged on the fingerprint sensing substrate;
wherein the at least one fingerprint sensing circuit is electrically connected to the sensing electrodes through the selection switches and the conductive wires;
wherein the fingerprint sensing substrate is a polymer substrate, a glass substrate, or a metal substrate;
wherein the fingerprint sensing substrate has a bent portion arranged between a first mounting face and a second mounting face, and the fingerprint sensing circuit is arranged on the second mounting face and the sensing electrode matrix is arranged on the first mounting face.

2. The fingerprint identifying apparatus in claim 1, wherein the fingerprint sensing circuit is a self-capacitance fingerprint sensing circuit.

3. The fingerprint identifying apparatus in claim 1, wherein the selection switches are thin film transistor switches or complementary metal-oxide-semiconductor (CMOS) switches.

4. The fingerprint identifying apparatus in claim 1, wherein the sensing electrodes and the conductive wires are made of non-transparent conductive material.

5. The fingerprint identifying apparatus in claim 1, wherein the sensing electrodes are made of transparent conductive material.

6. The fingerprint identifying apparatus in claim 1, wherein the first mounting face is closer to an upper casing of the casing in comparison with the second mounting face.

* * * * *